(12) United States Patent
Watanabe (10) Patent No.: US 11,520,341 B2
(45) Date of Patent: Dec. 6, 2022

(54) INFORMATION PROCESSING APPARATUS AND INFORMATION PROCESSING METHOD

(71) Applicant: TOSHIBA TEC KABUSHIKI KAISHA, Tokyo (JP)

(72) Inventor: Koichi Watanabe, Kawasaki Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 424 days.

(21) Appl. No.: 16/736,452

(22) Filed: Jan. 7, 2020

(65) Prior Publication Data
US 2020/0356099 A1 Nov. 12, 2020

(30) Foreign Application Priority Data
May 7, 2019 (JP) .............................. JP2019-087580

(51) Int. Cl.
G05D 1/00 (2006.01)
G05D 1/02 (2020.01)

(52) U.S. Cl.
CPC ......... G05D 1/0214 (2013.01); G05D 1/0016 (2013.01); G05D 1/0088 (2013.01)

(58) Field of Classification Search
CPC .. G05D 1/0214; G05D 1/0016; G05D 1/0088; G05D 2201/0216; G05D 1/0274;
(Continued)

(56) References Cited

U.S. PATENT DOCUMENTS

| 2011/0224031 A1* | 9/2011 | Underwood | ........... | A63B 61/02 |
| | | | | 473/492 |
| 2013/0198960 A1* | 8/2013 | Angott | ................... | A61B 5/704 |
| | | | | 5/622 |

(Continued)

FOREIGN PATENT DOCUMENTS

| EP | 2498158 A1 | 9/2012 |
| JP | 2005-310043 A | 11/2005 |

(Continued)

OTHER PUBLICATIONS

Fujita, T. "3D Sensing and Mapping for a Tracked Mobile Robot with a Movable Laser Ranger Finder," World Academy of Science, Engineering and Technology International Journal of Mechanical and Mechatronics Engineering, vol. 6, No. 2, 2012, 6 pages, URL: https://pdfs.semanticscholar.org/.

(Continued)

*Primary Examiner* — Yonel Beaulieu
(74) *Attorney, Agent, or Firm* — Kim & Stewart LLP (57) ABSTRACT

An information processing apparatus includes a processor configured to acquire first detection data for a first height range in a predetermined region. The processor generates a first environment map based on the first detection data and acquires second detection data for a second height range greater than the first height range in the predetermined region. The processor further acquires third detection data for a third height range included in the second height range and then superimposes a projected image of the third detection data on the first environment map to generate a superimposed image. The processor sets a prohibited area for an autonomous, mobile robot in the first environment map based on the superimposed image.

18 Claims, 7 Drawing Sheets

(58) Field of Classification Search
CPC ...... G05D 1/00; G06K 17/0029; G01S 17/08; G01S 17/89; G01S 17/93; G01S 17/00; G06Q 10/083
See application file for complete search history.

(56) References Cited

U.S. PATENT DOCUMENTS

| | | | | |
|---|---|---|---|---|
| 2018/0181793 | A1* | 6/2018 | Ariga | G06T 1/0007 |
| 2018/0300781 | A1* | 10/2018 | Watanabe | G06Q 10/0837 |
| 2019/0179015 | A1* | 6/2019 | Raring | H01S 5/02251 |
| 2020/0301439 | A1* | 9/2020 | Saito | G06K 7/10376 |
| 2020/0356099 | A1* | 11/2020 | Watanabe | G05D 1/0088 |
| 2022/0074762 | A1* | 3/2022 | Artes | G05D 1/0214 |

FOREIGN PATENT DOCUMENTS

| | | |
|---|---|---|
| JP | 2011-8320 A | 1/2011 |
| WO | 2019/037668 A1 | 2/2019 |

OTHER PUBLICATIONS

Extended European Search Report dated Jul. 20, 2020 in corresponding European Patent Application No. 20159032.0, 10 pages.

* cited by examiner

INFORMATION PROCESSING APPARATUS AND INFORMATION PROCESSING METHOD

CROSS-REFERENCE TO RELATED APPLICATIONS

This application is based upon and claims the benefit of priority from Japanese Patent Application No. 2019-087580, filed on May 7, 2019, the entire contents of which are incorporated herein by reference.

FIELD

An embodiment of the present invention relates to an information processing apparatus and an information processing method.

BACKGROUND

In recent years, there has been provided a reading system for reading a radio frequency tag such, as an RFID (Radio Frequency Identifier) tag, using an autonomous robot equipped with a tag reading antenna. The reading system reads the radio frequency tag as the autonomous robot passes in front of a storage fixture such as a shelf structure on which articles having radio frequency tags attached thereto are displayed.

Before reading the radio frequency tag(s), the reading system generates an environment map for self-location estimation by autonomous movement of the autonomous robot. For example, the reading system uses an LRF (Laser Range Finder) fixed at a predetermined height of the autonomous robot to generate an environment map by scanning the surrounding environment to be used for position estimation of the autonomous robot. The reading system generates the environment map to be used selecting a travel path to avoid prohibited areas for the autonomous robot depicted within the environment map.

A shelf structure may have shelves formed at different vertical heights with respect to each other. That is, the position or shape of one of the shelves detected by LRF fixed at a predetermined height may differ from the shape of the other shelves in the shelf structures. Therefore, it may be difficult to correctly set the prohibited areas for the autonomous robot in accordance with the actual shape of the shelf structures. If the prohibited areas are not correctly determined, there is a possibility that the moving path of the autonomous robot may not be set correctly. As a result, an autonomous robot may collide with a shelf structure during its autonomous movement.

DETAILED DESCRIPTION

According to an embodiment, an information processing apparatus includes a processor configured to acquire first detection data for a first height range in a predetermined region, such as a retail store floorspace or the like. The processor generates a first environment map based on the first detection data and acquires second detection data for a second height range greater than the first height range in the predetermined region. The processor also acquires third detection data for a third height range included in the second height range and then superimposes a projected image of the third detection data on the first environment map to generate a superimposed image. A prohibited area for an autonomous, mobile robot is set in the first environment map based on the superimposed image.

Hereinafter, an embodiment will be described in detail with reference to the accompanying drawings.

Figure 1:
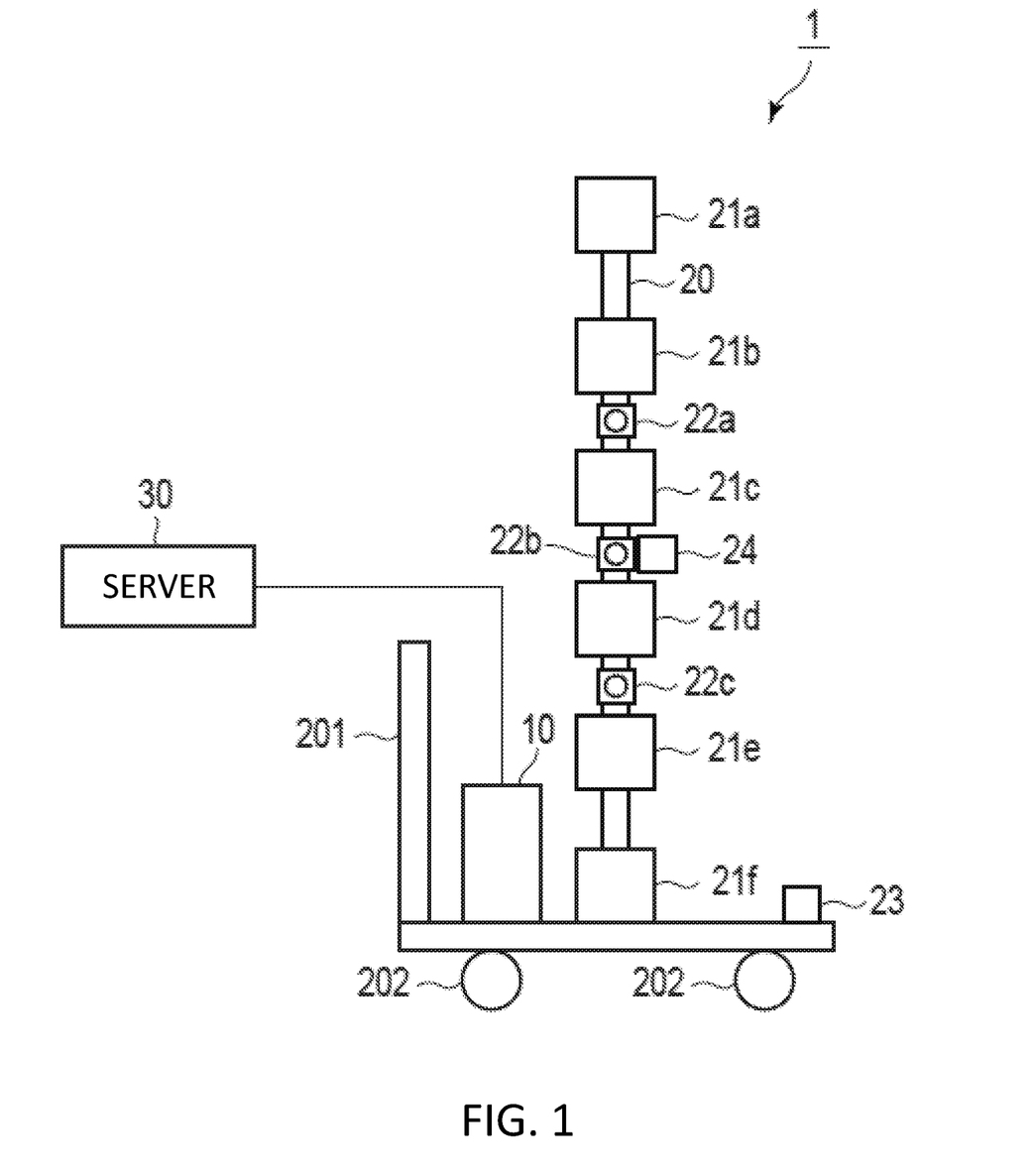
FIG. 1 is a schematic diagram illustrating an example configuration of a reading system according to an embodiment.
Figure 2:
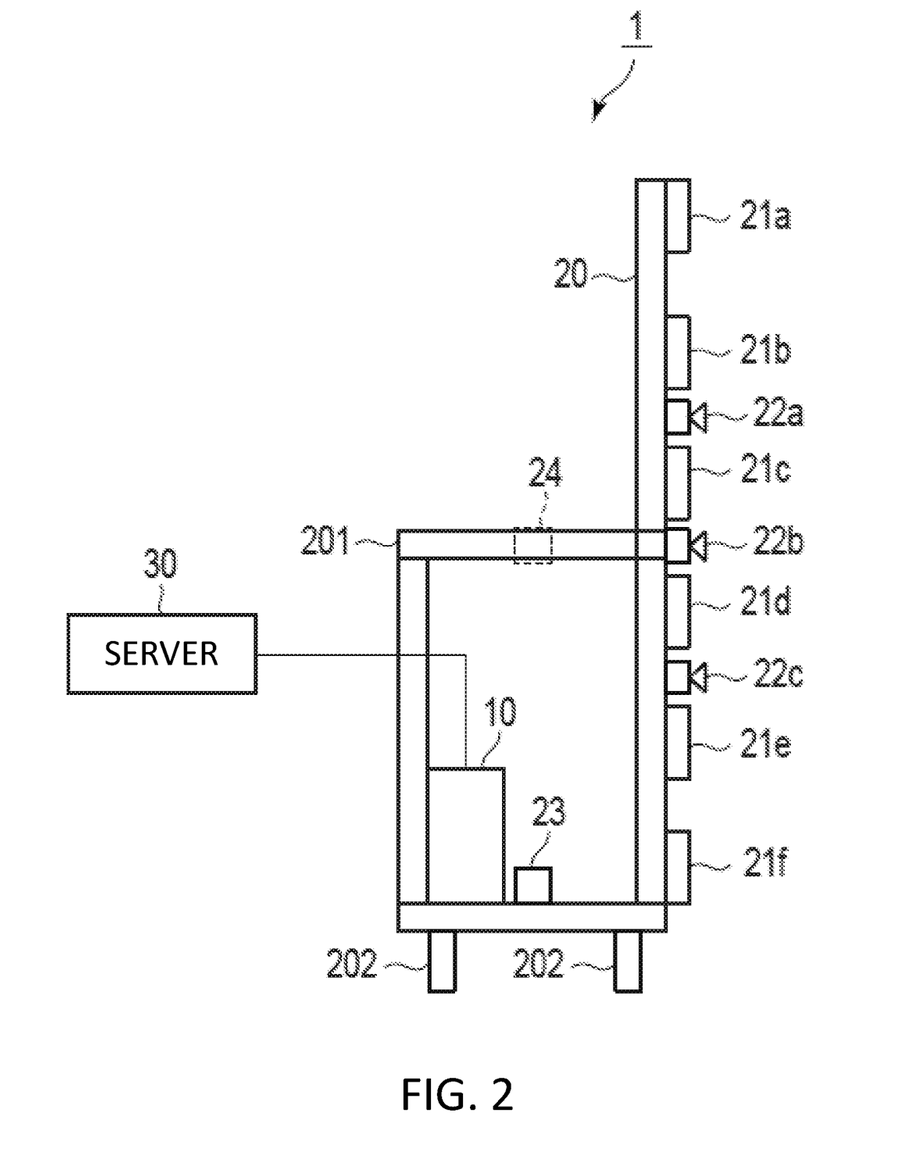
FIG. 2 is a schematic diagram illustrating an example configuration of a reading system according to an embodiment.

FIG. 1 and FIG. 2 are schematic diagrams showing an example configuration of a reading system 1. FIG. 1 is a diagram showing a configuration example of the reading system viewed from a direction orthogonal to the traveling direction of an autonomous robot 20. FIG. 2 is a diagram showing an example of the construction of the reading system 1 viewed along the traveling direction of the autonomous robot 20.

The reading system 1 is a system for reading a plurality of radio frequency tags in a region where a plurality of radio frequency tags are present. For example, the reading system 1 is used for inventory of articles in a store having a plurality of shelf structures each having plural shelves at varying heights at predetermined locations in the store.

Here, the reading system 1 executes reading of a radio frequency tag in a predetermined region A. Region A is the region checked for radio frequency tags by the reading system 1. For example, region A is an entire store having a fixed outer perimeter (e.g., a surrounding wall). In region A, there can be a sales register, a plurality of product shelves, or the like. A articles to which a radio frequency tag have been attached are displayed on the various product shelves (shelf structures). Each of the wall, the sales register and the product shelves is an example of a tangible object to be avoided. Other tangible objects may also be present in region A, for example, product tables, sales counters, and the like. These other objects may also be an obstacle to movement of an autonomous robot 20.

The reading system 1 includes a system controller 10, an autonomous robot 20, and a server 30. The system controller 10, the autonomous robot 20, and the server 30 are communicably connected to each other (e.g., networked).

The system controller 10 is an apparatus for controlling the autonomous robot 20. For example, system controller 10 controls autonomous movement of autonomous robot 20 using environment map M1 (see, e.g., FIG. 4). For example, the system controller 10 controls the reading of a plurality of radio frequency tags by the autonomous robot 20 during autonomous movement of the autonomous robot 20.

The environment map M1 is an environment map for self-location estimation for when autonomous robot 20 autonomously moves in region A, so as not to collide with an object in region A. The environment map M1 is a map including information indicating the position of an object existing in the region A in which autonomous robot 20 autonomously moves. The environment map M1 will be described later. The environment map M1 is also used to generate an environment map M2 (see, e.g., FIG. 7) for setting the travel path of autonomous robot 20. The environment map M1 is also referred to as a first environment map.

The environment map M2 is an environment map in which the prohibited area for the autonomous robot 20 has been set over the environment map M1. The environment map M2 is obtained by overlaying information indicating the prohibited area on the environment map M1. The prohibited area is an area within which the autonomous robot 20 is not to enter. Prohibited area in this context is treated as a virtual object which can be manipulated. Details of the environment map M2 will be described later. The environment map M2 is also referred to as a second environment map.

The configuration of the control system of the system controller 10 will be described later.

The autonomous robot 20 is a device that moves within region A according to the control of system controller 10.

In this example, the autonomous robot 20 includes a dolly 201 and wheels 202.

The dolly 201 forms the chassis of the autonomous robot 20. The dolly 201 includes a vertically extending support to which each element of the autonomous robot 20 is attached. The vertical direction refers to the same direction as the height direction.

The wheels 202 are attached to the lower portion of the dolly 201. The wheels 202 are driven by a motor 252 (see e.g., FIG. 3), which will be described later, to move the dolly 201. The wheels 202 change the movement direction of the dolly 201.

The autonomous robot 20 further comprises readers 21*a*, 21*b*, 21*c*, 21*d*, 22*e*, and 21*f*, three-dimension distance sensors 22*a*, 22*b*, and 22*c*, a horizontal LRF 23, and a vertical LRF 24. The readers 21*a*-21*f*, the three-dimension distance sensors 22*a*-22*c*, the horizontal LRF 23, and the vertical LRF 24 are attached to the dolly 201.

The readers 21*a*-21*f* are devices that wirelessly communicate with a radio frequency tag. The readers 21*a*-21*f* are mounted on the dolly 201 spaced along the vertical direction so and facing a direction orthogonal to the traveling direction of the autonomous robot 20.

Here, the configuration of the reader 21*a* will be described as an example. Configuration of readers 21*a*-21*f* are substantially similar.

The reader 21*a* includes a communication antenna (not separately depicted) and a communication control unit (not separately depicted). In this example, reader 21*a* is provided with a directional antenna. The detection range of the reader 21*a* is designed according to the characteristics of the communication antenna, the installation direction of the antenna, and the like. The detection range corresponds to a communication range between the reader 21*a* and the radio frequency tag(s). The reader 21*a* transmits radio waves to a radio frequency tag. Also, the reader 21*a* receives radio waves from the radio frequency tag. The reader 21*a* reads tag information, such as identification information of the radio frequency tag, based on the radio wave received from the radio frequency tag. The reader 21*a* transmits the tag information received from the radio frequency tag to the system controller 10. Since the configuration of the readers 21*b*-21*f* are the same as that of the reader 21*a*, the description thereof will not be repeated.

The combined detection ranges of the readers 21*a*-21*f* is set so as to include cover the highest and lowest shelf structure present in region A. In general, the number and position of readers provided in the autonomous robot 20 are not limited to a specific configuration. For example, autonomous robot 20 may include only a single reader having a sensing range sufficient for covering the highest and lowest shelf structures present in region A.

The horizontal LRF 23 is a sensor that measures a distance to an object with a laser along a horizontal plane. The horizontal LRF 23 can be attached to any position of the dolly 201. The horizontal LRF 23 scans the surrounding environment in the horizontal direction by emitting a laser beam in various horizontal directions, and then measures the distances to the objects in the region A. The horizontal LRF 23 obtains horizontal distance point group data composed of a plurality of distance points along a horizontal measurement range. The plurality of distance points are related to the position of objects, for each measurement position. The horizontal LRF 23 transmits distance information based on its measurements to the system controller 10 for each measurement position utilized. The distance information includes the distance point group data along the horizontal plane. The distance information from the horizontal LRF 23 can be used to generate stable environment map M1 by Simultaneous Localization and Mapping (SLAM) or the like. In addition, the distance information from the horizontal LRF 23 can be used for precise self-position estimation during autonomous movement of the autonomous robot 20.

The vertical LRF 24 is a sensor that measures a distance to an object. The vertical LRF 24 has a vertically oriented a measurement range. The vertical LRF 24 has relatively short range as compared to the horizontal LRF 23. The vertical LRF 24 is used to capture nearby object information around the autonomous robot 20 in three-dimensions (that is, vertical/height information of objects). The vertical LRF 24 can attached to any position of the dolly 201. The vertical LRF 24 scans the surrounding environment along the vertical direction by emitting a laser for several measurement positions, and measures the distance to objects in region A at various points along the vertical scan direction. The vertical LRF 24 obtains vertical distance point group data composed of a plurality of distance points related to the position of the measured object, for each measurement position along the vertical direction. The vertical LRF 24 transmits distance to the system controller 10 for each measurement position. The distance information includes a distance point group data along a vertical (height) direction.

The three-dimension distance sensor 22*a* is a sensor for measuring a distance to any object existing in the measurement range of the three-dimension distance sensor 22*a*. For example, the three-dimension distance sensor 22*a* may include, but is not limited to, a camera. The three-dimension distance sensor 22*a* measures over a relatively short distance. The three-dimension distance sensor 22*a* is used to capture object information surrounding the autonomous robot 20 in three-dimensions. The three-dimension distance sensor 22*a* obtains two-dimension distance point group data composed of a plurality of distance points related to the position of the measured object, for each measurement position. The three-dimension distance sensor 22a transmits distance information to the system controller 10 for each measurement position. The distance information includes a three-dimension distance point group data. Since the configuration of the three-dimension distance sensors 22b-22c is the same as that of the three-dimension distance sensor 22a, the description thereof will be omitted.

The three-dimension distance sensors 22a-22c are mounted on the support of the dolly 201 along the vertical direction so as to face a direction orthogonal to the traveling direction of the autonomous robot 20.

The combination of the measurement ranges of the three-dimension distance sensors 22a-22c is set to include a range from the floor to the ceiling of region A. The number and position of the three-dimension distance sensors 22a-22c in the autonomous robot 20 are not limited to a specific configuration. For example, autonomous robot 20 may include only a single three-dimension distance sensor with an overall coverage from a floor to ceiling of region A.

The server 30 is a device for processing information from the system controller 10. For example, the server 30 generates the environment map M1 of the region A prior to the reading operation of the plurality of radio frequency tags in the region A by the autonomous robot 20. Region A is also a region to be generated of environment map M1 by reading system 1. For example, the server 30 generates environment map M2. For example, the server 30 uses the environment map M2 to set the travel path of the autonomous robot 20 so as to avoid traveling within the prohibited area.

The server 30 is an example of an information processing apparatus.

The configuration of the control system of the server 30 will be described later.

Figure 3:
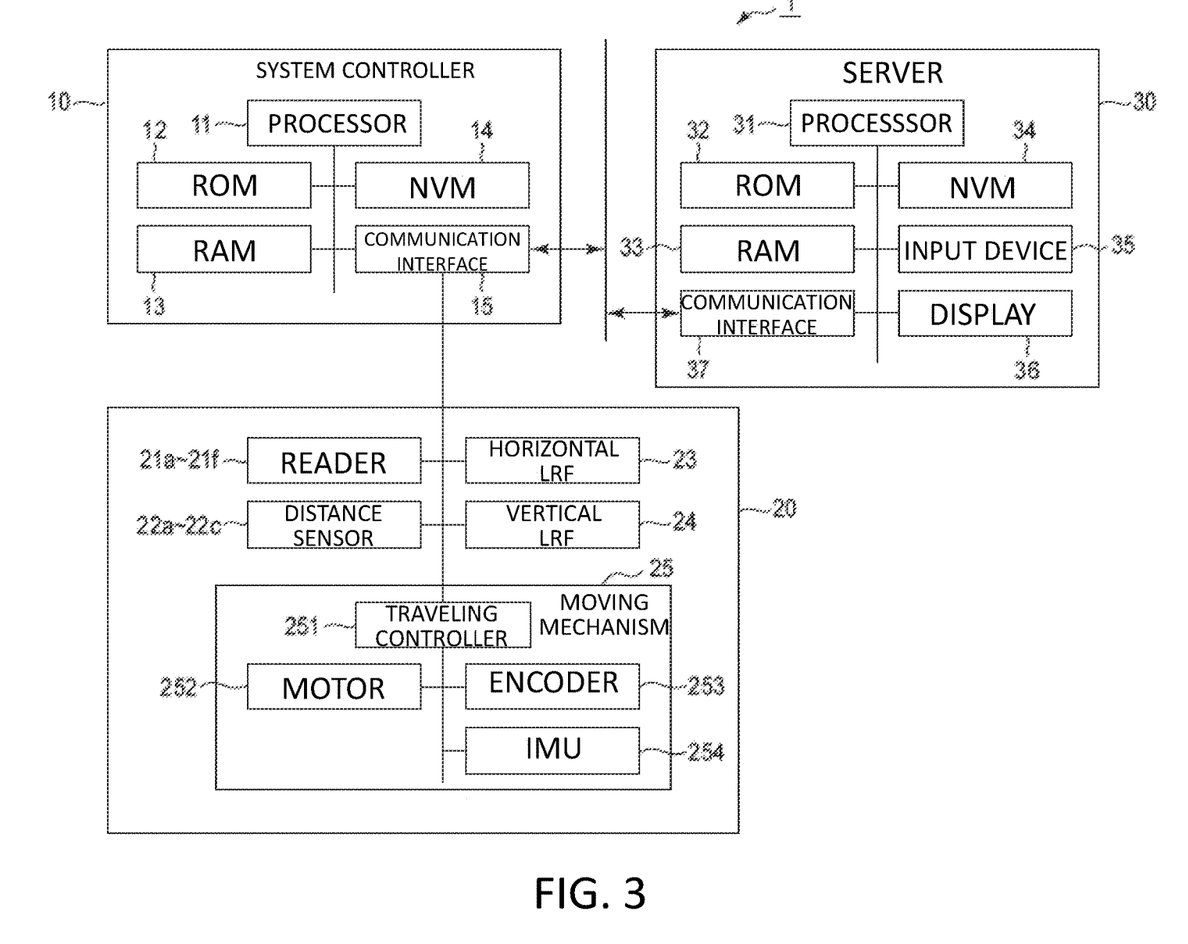
FIG. 3 is a block diagram illustrating an example configuration of a reading system according to an embodiment.

FIG. 3 is a block diagram showing an example of the configuration of the reading system 1.

The system controller 10 includes a processor 11, a read only memory (ROM) 12, a random access memory (RAM) 13, a non-volatile memory (NVM) 14, and a communication interface 15. The processor 11, the ROM 12, the RAM 13, the NVM 14, and the communication interface 15 are connected to each other via a data bus.

The processor 11 controls the overall operation of the system controller 10. For example, the processor 11 is a CPU (Central Processing Unit). The processor 11 is an example of a control unit. The processor 11 may include internal memory and various interfaces, etc. The processor 11 executes various processes by executing programs stored in the internal memory, the ROM 12, the NVM 14, and the like.

Part of the various functions realized by executing the program by the processor 11 may be realized by a hardware circuit. In this case, the processor 11 controls the functions executed by the hardware circuit.

The ROM 12 is a nonvolatile memory that stores control programs, control data, and the like. The ROM 12 is incorporated in the system controller 10 in a state in which control programs, and control data are stored at the manufacturing stage. That is, the control program and control data stored in the ROM 12 are incorporated in advance in accordance with the specifications of the system controller 10.

The RAM 13 is a volatile memory. The RAM 13 temporarily stores data or the like that is being processed by the processor 11. The RAM 13 stores various application programs based on instructions from the processor 11. Also, the RAM 13 may store data necessary for execution of the application program, execution results of the application program, and the like.

The NVM 14 is a nonvolatile memory capable of writing and rewriting data. For example, the NVM 14 includes an HDD (Hard Disk Drive), an SSD (Solid State Drive), an EEPROM (Electrically Erasable Programmable Read-Only Memory), and a flash memory. The NVM 14 stores control programs, applications and various data according to the operational use of the system controller 10. The NVM 14 is an example of a storage unit.

The communication interface 15 is an interface for transmitting and receiving data in a wired or wireless manner. For example, the communication interface 15 is an interface that supports a LAN (Local Area Network) connection. The communication interface 15 transmits and receives information to and from the autonomous robot 20 in a wired or wireless manner. The communication interface 15 transmits and receives information to and from the server 30 by wired or radio communication.

The autonomous robot 20 includes readers 21a-21f, three-dimension distance sensors 22a-22c, a horizontal LRF 23, a vertical LRF 24, and a moving mechanism 25. The readers 21a-21f, the three-dimension distance sensors 22a-22c, the horizontal LRF 23, and the vertical LRF 24 are as described above.

The moving mechanism 25 is a mechanism for moving the autonomous robot 20. The moving mechanism 25 includes a travel controller 251, a motor 252, an encoder 253, an IMU (Inert measurement unit) 254, and the like. The travel controller 251, the motor 252, the encoder 253, and the IMU 254 are electrically connected to each other.

The travel controller 251 moves autonomous robot 20 in accordance with the control of system controller 10. The travel controller 251 controls the motor 252 to move the autonomous robot 20. The travel controller 251 provides power and drive pulses to the motor 252.

The travel controller 251 includes a processor and the like. Travel controller 251 may be executed by a processor executing software. In other examples, the travel controller 251 may comprise hardware such as an ASIC (Application Specific Integrated Circuit) functioning as a processor.

The motor 252 is driven in accordance with the control of the travel controller 251. The motor 252 is connected to the wheels 202 via a gear or a belt or the like. The motor 252 rotates the wheels 202 by supplying a driving force.

The encoder 253 is connected to the rotation axis of the motor 252. The encoder 253 is an example of a sensor for measuring the rotation angle of the motor 252. The encoder 253 transmits measurement information indicating the rotation angle to the system controller 10. Note that the encoder 253 may be incorporated in the motor 252.

The IMU 254 is a sensor for measuring the angle or the angular velocity about three axes and the acceleration along three axes. IMU 254 transmits measurement information indicative of a three axis angle or angular velocity and an acceleration along three axes to system controller 10.

In some examples, the autonomous robot 20 may instead or also be equipped with the system controller 10. In some examples, the autonomous robot 20 incorporates hardware and/or software to provide a function or functions presently described as being provided by the processor 11 in the system controller 10.

The server 30 includes a processor 31, a ROM 32, a RAM 33, an NVM 34, an input device 35, a display device 36, a communication interface 37, and the like. The processor 31, the ROM 32, the RAM 33, the NVM 34, the input device 35, the display device 36, and the communication interface 37 are connected to each other via a data bus or the like.

The processor 31 controls the overall operation of the server 30. For example, the processor 31 is a CPU. The processor 31 is an example of a control unit. The processor 31 may include internal memory and various interfaces, etc. The processor 31 executes various processes by executing programs stored in the internal memory, and the ROM 32, the NVM 34.

Some of the various functions realized by the processor 31 executing a program may instead be realized by a dedicated hardware circuit or the like. In such a case, the processor 31 controls the functions executed by the dedicated hardware circuit(s).

The ROM 32 is a nonvolatile memory that stores control programs, control data, and the like. The ROM 32 is incorporated in the server 30 in a state in which control programs, control data, and the like are stored at the manufacturing stage. That is, the control program and the control data stored in the ROM 32 are incorporated in advance according to the specifications of the server 30.

The RAM 33 is a volatile memory. The RAM 33 temporarily stores data or the like that is being processed by the processor 31. The RAM 33 stores various application programs based on instructions from the processor 31. Also, the RAM 33 may store data necessary for execution of the application program, execution results of the application program, and the like.

The NVM 34 is a nonvolatile memory capable of writing and rewriting data. For example, the NVM 34 is composed of an HDD, an SSD, an EEPROM, a flash memory, or the like. The NVM 34 stores a control program, an application, various data, and the like according to the operational use of the server 30. The NVM 14 is an example of a storage unit.

The input device 35 is a device that accepts an instruction based on a user operation. For example, input device 35 may include, but is not limited to, a keyboard or a touch pad. The input device 35 is an example of an input unit. The input device 35 may be an element included in the server 30, or may be an element independent of the server 30.

The display device 36 is a device for displaying various types of images. For example, the display device 36 is a liquid crystal display, but is not limited thereto. The display device 36 is an example of a display unit. The display device 36 may be an element included in the server 30, or may be an element independent of the server 30.

The communication interface 37 is an interface for transmitting and receiving data in a wired or wireless manner. For example, communication interface 37 is an interface that supports a local area network (LAN) connection. The communication interface 37 transmits and receives information to and from the system controller 10 by wired or radio communication.

For example, the communication interface 37 receives distance information from the horizontal LRF 23, distance information from the vertical LRF 24, distance information from the three-dimension distance sensors 22a-22c, measurement information from the encoder 253, and measurement information from the IMU 254 from the system controller 10. Distance information from the horizontal LRF 23, distance information from the vertical LRF 24, distance information from the three-dimension distance sensors 22a-22c, measurement information from the encoder 253, and measurement information from the IMU 254 can also be referred to as sensor information.

In this example, the processor 31 executes the functions described below by executing software stored in the ROM 32 or the NVM 34.

The processor 31 generates an environment map M1.

In connection with generating environment map M1, the processor 31 performs as a first acquisition unit and a first generation unit, as described below.

The processor 31 executes instructions to perform as a first acquisition unit for acquiring the first detection data. The first detection data is data relating to the first height range in the moving region A for the autonomous robot 20. The first height range can be in any range. The first height range may have a predetermined height without any width dimension information, or may include width dimension information along the height direction. That is, the first detection data may be the distance point group of only two-dimensions, or may be a three-dimension distance point group. The predetermined height corresponds to the position in the height direction of the distance point group data obtained by the vertical LRF 24. The first height range is related to the generation of environment map M1. Therefore, for example, from the viewpoint of data processing, it is preferable that the first height range is a predetermined height or a relatively narrow range.

For example, the processor 31 controls the autonomous robot 20 to move within region A to generate the environment map M1 via the system controller 10. The processor 31 acquires sensor information from the autonomous robot 20 via the system controller 10 in response to the circulation in the region A by the autonomous robot 20. The processor 31 collects sensor information until a cycle of movement within region A by autonomous robot 20 is completed. The processor 31 stores sensor information in the NVM 34.

An example of acquiring the first detection data when the first height range is a predetermined height will now be described. In one example, the processor 31 refers to the horizontal distance point group included in the distance information according to the relationship of horizontal LRF 23. The processor 31 acquires horizontal distance point group data as a distance point group data of two-dimensions at a predetermined height. In another example, the processor 31 refers to the three-dimension distance point group included in the distance information by the three-dimension distance sensors 22a-22c. The processor 31 acquires the distance point group of two-dimensions at a prescribed height from the three-dimension distance point group data.

An example of acquiring the first detection data in a case where the first height range has a width in the height direction will be described. In one example, the processor 31 refers to the distance point group data in the horizontal direction included in the distance information by the horizontal LRF 23 and the distance point group data in the vertical direction included in the distance information by the vertical LRF 24. In another example, the processor 31 refers to the three-dimension distance point group included in the distance information by the three-dimension distance sensors 22a-22c. The processor 31 acquires the three-dimension distance point group data in the first height range from the three-dimension distance point group data. The processor 31 combines the horizontal distance point group data and the vertical distance point group data to form a three-dimension distance point group data. The processor 31 acquires the three-dimension distance point group data in the first height range from the three-dimension distance point group data.

The processor 31 executes a first generation unit that generates environment map M1 based on the first detection data.

For example, the processor 31 generates environment map M1 by simultaneous location and mapping (SLAM) based on the first detection data. If the first height range is a predetermined height, the processor 31 generates an environment map M1 by SLAM based on distance information as seen from the horizontal LRF 23. In this case, environment map M1 is an environment map of two-dimensions. When the first height range has a width in the height direction, the processor 31 generates an environment map M1 by the SLAM based on the three-dimension distance point group data. Thus, the position information of the object measured in three-dimensions is determined. In this case, environment map M1 is a three-dimension environment map. In addition to the first detection data, the processor 11 may also use measurement information based on the measurement of the encoder 253 included in the sensor information and measurement information based on the IMU 254. The processor 11 stores indicating environment map M1 in the NVM 34. The system controller 10 can estimate the self-position of the autonomous robot 20 by matching the distance information by the horizontal LRF 23 and the environment map M1 when autonomous movement of the autonomous robot 20.

Figure 4:
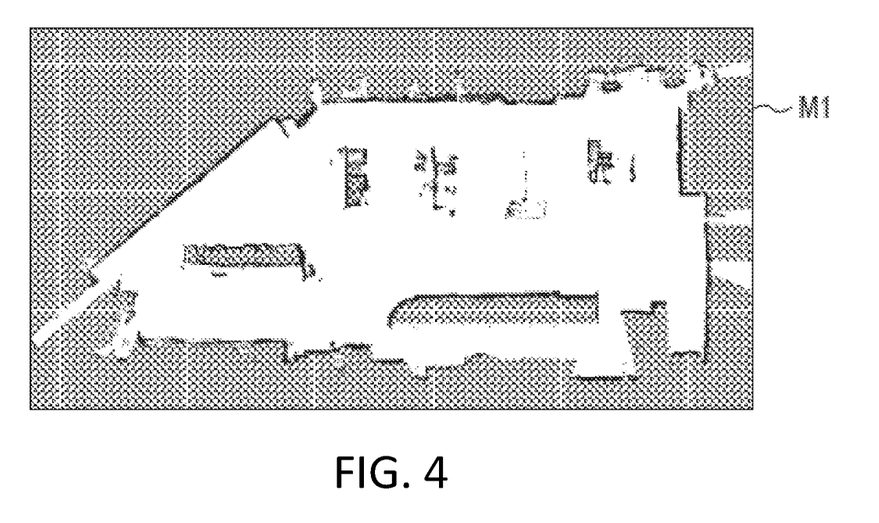
FIG. 4 is a diagram illustrating an environment map according to an embodiment.

FIG. 4 is a diagram illustrating an environment map M1 when the first height range is a predetermined height. Here, an environment map M1 when the first height range is a predetermined height will be described as an example. For this reason, environment map M1 is two-dimensional.

The environment map M1 is represented by an unknown region, a free region, and an obstacle region. The unknown region is a region in which an object is present by the horizontal LRF 23 and which cannot be measured by the horizontal LRF. The unknown region is a region by the dotted texture/hatching in FIG. 4. The free region is a region that is considered to be free of objects according to measurements by the horizontal LRF 23. In FIG. 4, the free region is a region depicted as white (clear/untextured) space. The obstacle region is a region that has been recognized as including an object when measured by the horizontal LRF 23. The obstacle regions are depicted by black (solid) lines in FIG. 4.

It should be noted that the first height range may be set to have a width, and the processor 31 may generate a three-dimension environment map M1 expanded over this width dimension. In this case, the system controller 10 can estimate the self-position of the autonomous robot 20 more robustly with respect to environmental changes by using the three-dimension environment map M1.

The processor 31 has the function of generating superimposed image I.

The superimposed image I is an image obtained by superimposing a projection image of the second detection data related to the third height range included in the third height range on the environment map M1. The third detection data is data included in the second detection data.

The processor 31 executes a second acquisition process that functions as a second acquisition unit, a third acquisition process that functions as a third acquisition unit, and a second generation process that functions as a second generation unit, as exemplified below, in connection with the function of generating a superimposed image I.

The processor 31 executes a second acquisition process for acquiring the second detection data, and thereby functions as a second acquisition unit. The second detection data is data relating to a second height range that is larger than the first height range in region A. The second detection data is the three-dimension distance point group data in the second height range. Since the second height range is related to the setting of the prohibited area of autonomous robot 20, it is preferred to be a relatively wide range. For example, the second height range ranges from a floor surface to a ceiling surface of region A.

In one example, the processor 31 refers to the three-dimension distance point group included in the distance information by the distance sensors 22a-22c. The processor 31 acquires the three-dimension distance point group data in the second height range from the three-dimension distance point group data. In another example, the processor 31 refers to the horizontal distance point group data provided in the distance information from the horizontal LRF 23 and the vertical distance point group data provided in the distance information from the vertical LRF 24. The processor 31 combines the horizontal distance point group data and the vertical distance point group data to form a three-dimension distance point group data. The processor 31 acquires the three-dimension distance point group data in the second height range from the three-dimension distance point group data.

The processor 31 executes a second acquisition process that acquires third detection data relating to the third height range from the third detection data, and thereby functions as a second acquisition unit. The third height range is a range included in the second height range. The third height range includes the position of the upper end in the height direction of the autonomous robot 20, and is in a range from a position higher than the floor surface of the region A to a position lower than the ceiling surface of the region A. Therefore, the third detection data does not include data about the position of the floor surface of the region A or data about the position of the region A ceiling.

For example, the processor 31 acquires the third detection data in accordance with the designation of the third height range by the user using the input device 35.

The processor 31 may autonomously acquire the third detection data in accordance with a third height range set in advance. In this case, the processor 31 acquires the third detection data without requiring the user to designate the third height range by using the input device 35.

The processor 31 executes a second generation process that generates a superimposed image I, and thereby functions as a second generation unit.

The processor 31 superimposes the projection image obtained by projecting the third detection data in the vertical direction with respect to the environment map M1, thereby generating a superimposed image I. As described above, the third detection data does not include data on the position of the floor surface of the region A and data on the position of the region A ceiling surface. Therefore, the projection image of the third detection data indicates an outline of an object such as a shelf without indicating a floor surface or a ceiling surface of the region A. The superimposed image I is used for setting the prohibited area for the autonomous robot 20.

Figure 5:
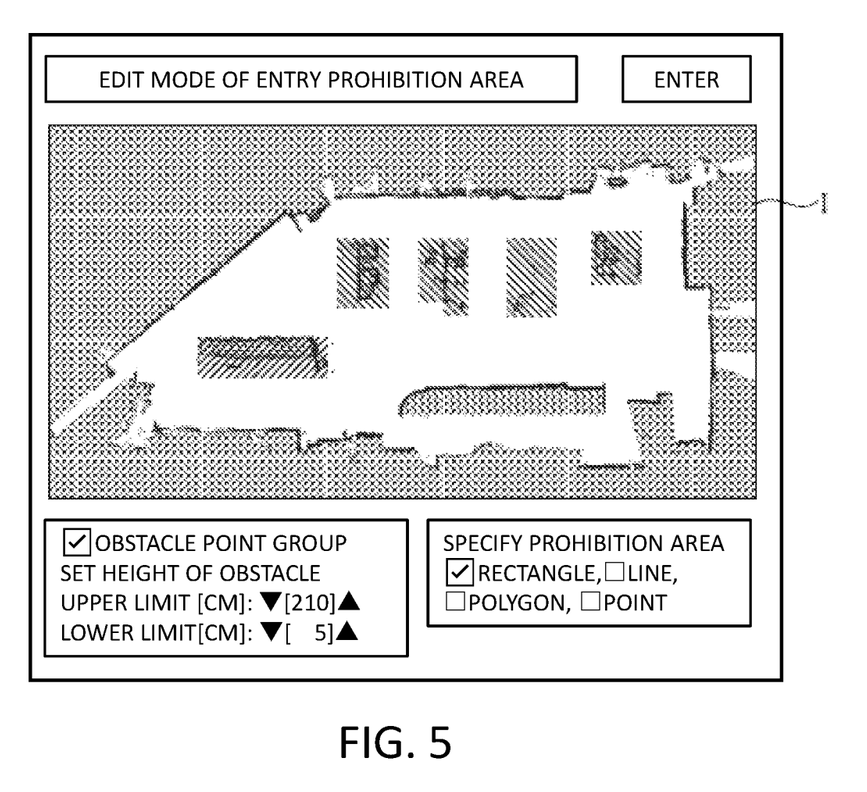
FIG. 5 is a screen diagram showing an example of generating the superimposed image according to the embodiment.

FIG. 5 is a screen diagram showing an example of the generation of the superimposed image I.

In FIG. 5, the projection image of the third detection data is indicated by a diagonal line. The projection image of the third detection data is displayed so as to include an object drawn in the environment map M1.

The processor 31 displays the edit screen of the prohibited area on the display device 36 in accordance with the operation of starting the setting of the prohibited area by the user using the input device 35. The processor 31 displays environment map M1 on an edit screen of prohibited area. The processor 31 acquires a specified value of the third height range in accordance with the selection operation of the obstacle point group display by the user using the input device 35. The specified value of the third height range is a specified value of the lower limit and upper limit of the obstacle height range setting illustrated in FIG. 5. The specified value of the third height range can be specified by the user by using the input device 35. The processor 31 displays the superimposed image I by displaying the projected image of the third sensed data for the designated third height range in an overlay on the environment map M1.

Note that the third detection data is changed in accordance with the change in the third height range. The processor 31 controls, in the display device 36, to display the superimposed image I in which the projected image of the third detected data is changed in response to the change in the designated value of the third height range by the user using the input device 35. When the lower limit of the third height range is close to the position of the floor surface, the third detected data may include the distance point group data of the floor surface as noise. Similarly, when the upper limit of the third height range is close to the ceiling surface position, the third detection data may inadvertently include distance point group data for the ceiling surface as noise or in error. When the third detection data includes such noise, the projection image of the third detection data may inadvertently include a floor surface or a ceiling surface of region A, and may therefore not provide an appropriate shape of the object. Therefore, the user can appropriately change the third height range so that the projection image of the third detection data appropriately captures only the outer shape of the object.

The processor 31 generates environment map M2.

The processor 31, in conjunction with generating the environment map M2, executes a setting process and a third generating process as illustrated below.

The processor 31 executes a setting process for setting the prohibited area of the autonomous robot 20 to the environment map M1 based on the superimposed image I, and thereby functions as a setting unit. For example, the processor 31 sets prohibited areas within the environment map M1 in accordance with the designation of the prohibited area in the "superimposed image I" provided by the user using the input device 35. The user can set the prohibited area using marks input by use of the input device 35 on projection image of the third detection data. For example, a user may set a predetermined form, such as a rectangle, to be the prohibited area.

Figure 6:
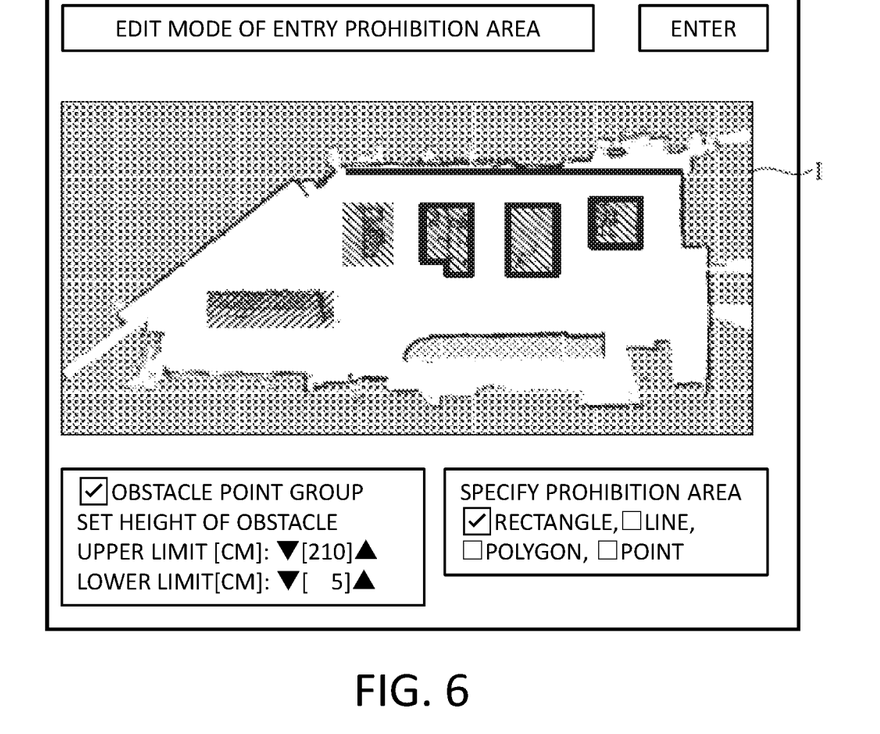
FIG. 6 is a screen diagram showing an example of setting the prohibited area according to the embodiment.

FIG. 6 is a screen diagram showing an example of a setting screen for setting a prohibited area.

The processor 31 sets the prohibited area for the environment map M1 in accordance with the designation of the prohibited area in the superimposed image I from the user using the input device 35. The processor 31 displays prohibited area in the superimposed image I. The user can set one or more prohibited areas in environment map M1 by selecting a rectangle, a line, a polygon, or a point, as illustrated in FIG. 5, by using input device 35. The possible shapes for setting of the prohibited area is not limited to the above examples. In FIG. 6, prohibited area is indicated by a thick line. The processor 31 terminates the setting of the prohibited area in accordance with the selection operation of the confirmation button by the user using the input device 35. The confirmation button is an example of an input for ending the setting of the prohibited area to finally register the prohibited area.

In some examples, the processor 31 may autonomously set the prohibited area for the environment map M1 without relying on the user designation of the prohibited area in the superimposed image I. For example, the processor 31 may set prohibited area based on the projected image of the third detection data. In this example, the processor 31 sets prohibited area to include a projected image of the third detected data. The processor 31 may set the prohibited area so as to match the projection image of the third detection data, or may set the prohibited area so as to cover the projection image of the third detection data without exactly matching the projection image. The processor 31 may set prohibited area to a predetermined form, such as a rectangle.

The processor 31 executes a third generation process that generates environment map M2, and thereby functions as a third generation unit. For example, the processor 31 generates an environment map M2 according to a selection operation of a confirmation button by a user using the input device 35 in the edit screen of the prohibited area. The environment map M2 does not include a projection image of the third detection data. The processor 11 stores indicating environment map M2 in the NVM 34. Since environment map M2 contains information indicating prohibited area, it cannot be used for self-position estimation of autonomous robot 20.

Figure 7:
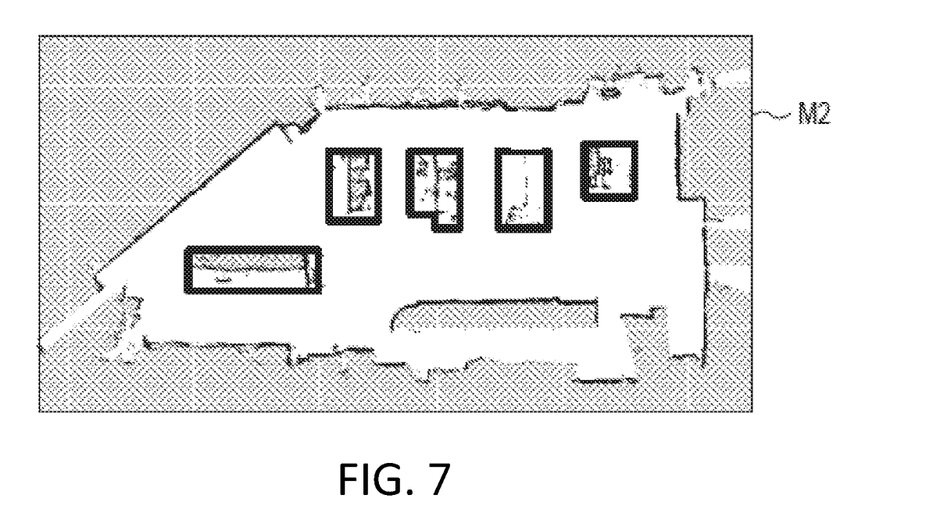
FIG. 7 is a diagram illustrating an environment map according to an embodiment.

FIG. 7 is a diagram illustrating an environment map M2.

In FIG. 7, each prohibited area is indicated by an area surrounded by a thick line.

The processor 31 has the function of setting the travel path of the autonomous robot 20 using the environment map M2.

Figure 8:
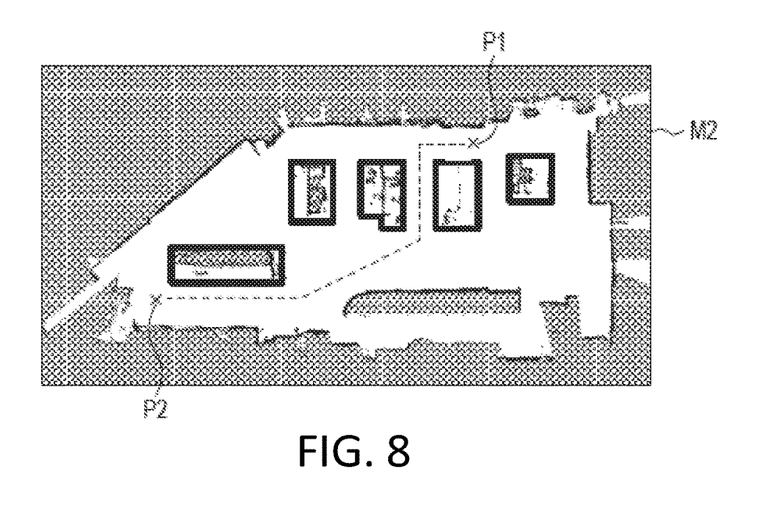
FIG. 8 is a diagram illustrating an example of setting a travel path using an environment map according to an embodiment.

FIG. 8 is a diagram illustrating an example of setting a travel path using an environment map M2.

First, the processor 31 determines an input for starting a reading operation by a user using the input device 35. Processor 31 then obtains data representing environment map M2 from NVM 34. Next, the processor 31 uses the environment map M2 to set a travel path from the current position P1 to the work start position P2. The processor 31 sets a moving path by avoiding the prohibited area(s), that is so the autonomous robot 20 does not enter into a prohibited area during travel. It is preferable that the processor 31 sets a moving route so as to pass through positions away from the prohibited area by an amount which takes the size of the autonomous robot 20 into consideration. This is, because the autonomous robot 20 is likely to come into contact with the object when the prohibited area is right next to the object and a portion of the travel path is right next to the prohibited area. Similarly, the processor 31 uses the environment map M2 to set a travel path from the work start position P2 to a target position.

Figure 9:
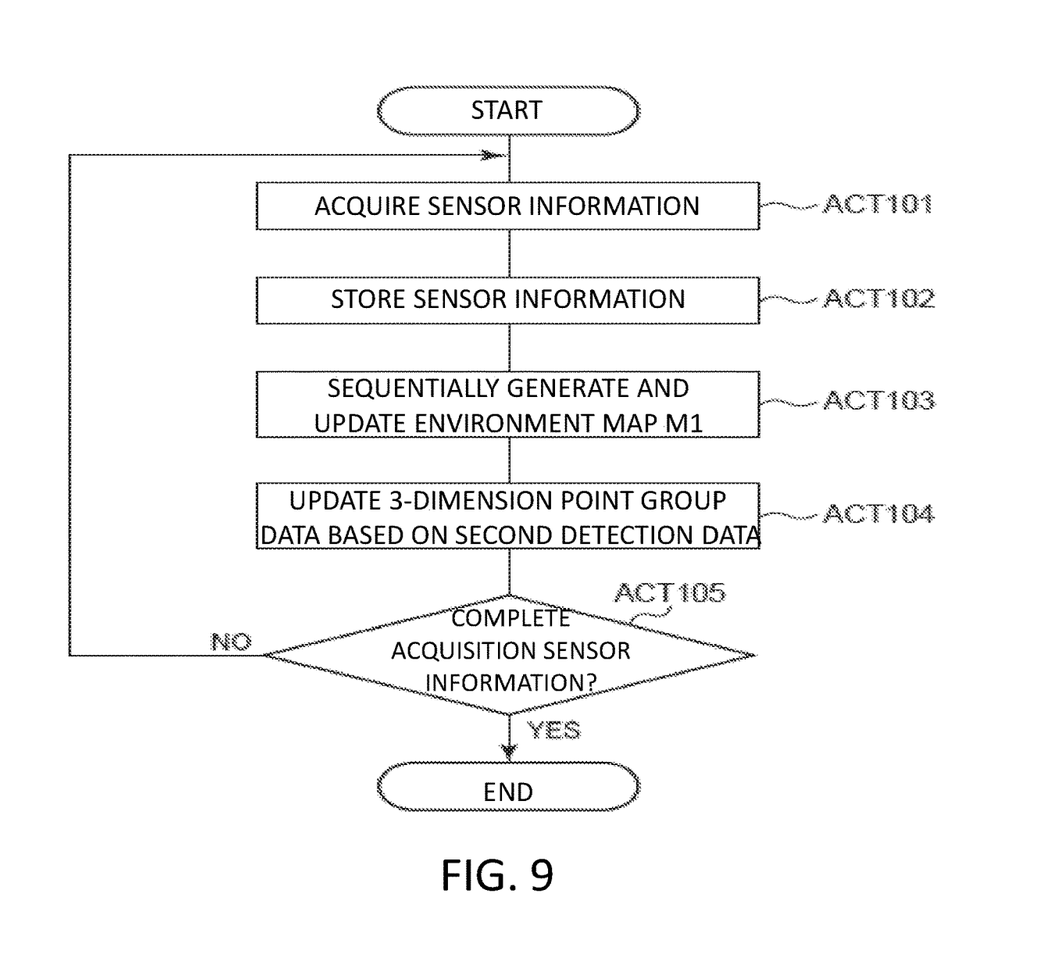
FIG. 9 is a flowchart showing an example of the operation for generating a first environment map and three-dimension point group data.

FIG. 9 is a flow chart showing an example of an operation for generating the environment map M1 and the three-dimension point group data by the processor 31. The three-dimension point group data is the coordinates (x, y, z) on the map on which the object is detected.

The processor 31 starts generating the environment map M1 and the three-dimension point group data in response to the start of the circulation in the region A for generating the environment map M1 by the autonomous robot 20.

The processor 31 acquires sensor information from the autonomous robot 20 via the system controller 10 (ACT 101). The processor 31 stores the sensor information in the RAM 33 or the NVM 34 (ACT 102). The processor 31 sequentially generates and updates environment map M1 based on the first detected data by the SLAM in accordance with the stored sensor information (ACT 103). The processor 31 generates and updates the three-dimension point group data based on the third detection data according to the estimated self-position by the SLAM (ACT 104).

The processor 31 determines whether or not the acquisition of sensor information in the region A has been completed (ACT 105). In ACT 105, for example, the processor refers to information indicating the end of the circulation within the region A by autonomous robot 20 from the system controller 10. Based on the reception of information indicating the end of the circulation, the processor 31 determines that the acquisition of the sensor information in the region A has been completed.

When it is determined that the acquisition of the sensor information in the region A is not completed (NO in ACT 105), the processor 31 repeats the operation of ACT 101. When it is determined that the acquisition of sensor information in region A has been completed (ACT 105, YES), the processor 31 terminates the processing.

In this example, environment map and three-dimension point group data were generated at the same time as the sensor information was acquired. When the processor performance and the memory capacity are limited, the accumulation of sensor information may first be executed for all the regions, the SLAM may be executed from stored data, and environment map generation and three-dimension point group data may be generated. However, in the latter case, it is not possible to confirm the map that is being updated simultaneously with the acquisition of the various sensor information.

Figure 10:
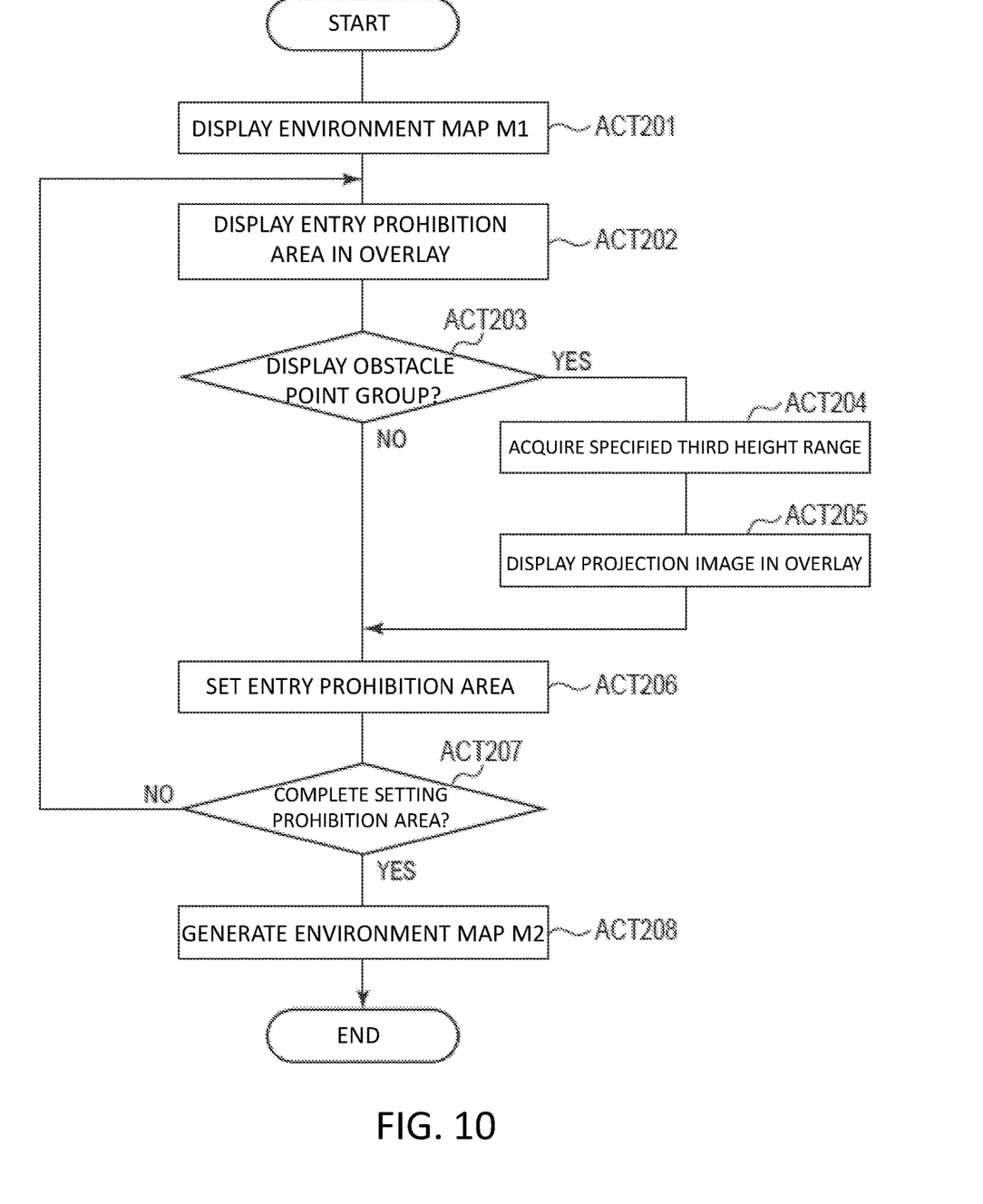
FIG. 10 is a flowchart illustrating an example of an operation for generating a second environment map.

FIG. 10 is a flowchart illustrating an example of an operation for generating the environment map M2 by the processor 31. Here, an example will be described in which the processor 31 generates the environment map M2 in accordance with the designation of the prohibited area by the user using the input device 35.

The processor 31 displays the edit screen for the prohibited area on the display device 36 in accordance with the operation of starting the setting of the prohibited area by the user using the input device 35.

The processor 31 displays the environment map M1 on the display device 36 (ACT 201). The processor 31 displays the prohibited area as presently set in the environment map M1 as an overlay (ACT 202). The processor 31 determines whether or not the selection operation of the obstacle point group display by the user using the input device 35 has been detected (ACT 203).

When the selection operation of the obstacle point group display is detected (ACT 203, YES), the processor 31 acquires a specified value of the third height range (ACT 204). The processor 31 displays the projected image I by overlaying the projection image of the third detection data related to the designated third height range with respect to the environment map M1 (ACT 205).

In response to the designation of the prohibited area by the user, the processor 31 sets the prohibited area of the autonomous robot 20 with respect to the environment map M1 based on the superimposed image I (Act 206). When no obstacle point group display operation is detected (ACT 203, NO), the processor 31 sets the environment map M1 to the environment map M1 according to the designation of the prohibited area by the user in Act 206.

The processor 31 determines whether or not the setting of the prohibited area has been completed in accordance with operation of the confirmation button by the user using the input device 35 (ACT 207). When it is determined that the setting of the prohibited area has not been completed (ACT 207, NO), the processor 31 returns to ACT 202 and repeats the process. When it is determined that the setting of the prohibited area has been completed (YES in ACT 207), the processor 31 determines a prohibited area and generates an environment map M2 (ACT 208).

According to the present embodiment, the server 30 can generate an environment map M2 based on the superimposed image I obtained by superimposing the projection image of the third detection data on the environment map M1.

Thus, the server 30 can support the setting of the appropriate prohibited area for the object existing in the region A. As a result, the server 30 uses the environment map M2 to set the travel path of the autonomous robot 20 so as to avoid the prohibited area, so that the collision of the autonomous robot 20 with an object can be avoided.

According to the present embodiment, the server 30 can set the prohibited area in accordance with the designation of the prohibited area in the superimposed image I by the user.

In this way, the server 30 can accept the designation of the prohibited area by the user. The user can set the prohibited area in anticipation of safety while confirming the projected image of the third detection data.

According to the present embodiment, the server 30 can also set the prohibited area based on the projected image of the third detection data. Thus, the server 30 can reduce the user workload required to set the prohibited area.

According to the present embodiment, the third height range includes the position of the upper end in the height direction of the autonomous robot 20, and is a range from a position higher than the floor surface of the region A to a position lower than the ceiling surface of the region A.

Thus, the server 30 can obtain a projection image of the third detection data in the height range in which the autonomous robot 20 is opposed to the object. Therefore, the server 30 can support the setting of the appropriate prohibited area for the object existing in the region A.

Although the present embodiment has been described with respect to an example of processing to be executed by the processor 31 of the server 30, the present disclosure is not limited thereto. In other embodiments, such processing may be executed by the processor 11 of the system controller 10. In such a case, the system controller 10 serves as an example of an information processing apparatus.

While certain embodiments have been described, these embodiments have been presented by way of example only, and are not intended to limit the scope of the present disclosure. Indeed, the novel embodiments described herein may be embodied in a variety of other forms; furthermore, various omissions, substitutions and changes in the form of the embodiments described herein may be made without departing from the spirit of the present disclosure. The accompanying claims and their equivalents are intended to cover such forms or modifications as would fall within the scope and spirit of the present disclosure.

What is claimed:

1. An information processing apparatus, comprising:
a processor configured to:
    acquire first detection data for a first height range in a predetermined region;
    generate a first environment map based on the first detection data;
    acquire second detection data for a second height range greater than the first height range in the predetermined region;
    acquire third detection data for a third height range included in the second height range;
    superimpose a projected image of the third detection data on the first environment map to generate a superimposed image; and
    set a prohibited area for a robot in the first environment map based on the superimposed image.

2. The information processing apparatus according to claim 1, wherein the prohibited area is set in accordance with a designation on the superimposed image by a user.

3. The information processing apparatus according to claim 1, wherein the prohibited area is set based on the projected image.

4. The information processing apparatus according to claim 1, wherein the third height range includes a position of an upper end in a height direction of the robot and is a range from a position higher than a floor of the predetermined region to a position lower than a ceiling of the predetermined region.

5. The information processing apparatus according to claim 4, wherein the processor is further configured to acquire the third detection data in accordance with a designation of the third height range by a user.

6. The information processing apparatus according to claim 1, wherein
the first detection data comprises distance sensor information acquired in the first height range, and
the second detection data comprises distance sensor information acquired in the second height range.

7. The robot recited in claim 1, comprising:
a cart body;
a distance sensor on the cart body; and
a controller communicably connected to the information processing apparatus according to claim 1, wherein
the controller is on the cart body and configured to control movement of the cart body within the predetermined region according to the first environment map, which is provided by the information processing apparatus.

8. An information processing method, comprising:
acquiring first detection data for a first height range in a predetermined region;
generating a first environment map based on the first detection data;
acquiring second detection data for a second height range greater than the first height range in the predetermined region;
acquiring third detection data for a third height range included in the second height range;
superimposing a projected image of the third detection data on the first environment map to generate a superimposed image; and
setting a prohibited area of a robot in the first environment map based on the superimposed image.

9. The method according to claim 8, wherein the prohibited area is set in accordance with a designation on the superimposed image by a user.

10. The method according to claim 8, wherein the prohibited area is set based on the projected image.

11. The method according to claim 8, wherein the third height range includes a position of an upper end in a height direction of the robot and is a range from a position higher than a floor of the predetermined region to a position lower than a ceiling of the predetermined region.

12. The method according to claim 11, further comprising:
acquiring the third detection data in accordance with a designation of the third height range by a user.

13. The method according to claim 8, wherein
the first detection data comprises distance sensor information acquired in the first height range, and
the second detection data comprises distance sensor information acquired in the second height range.

14. A non-transitory computer-readable medium storing instructions that when executed by a processor cause the processor to:
acquire first detection data relating to a first height range in a predetermined region;
generate a first environment map based on the first detection data;
acquire second detection data relating to a second height range greater than the first height range in the predetermined region;
acquire third detection data relating to a third height range included in the second height range;
superimpose a projected image of the third detection data on the first environment map to generate a superimposed image; and
set a prohibited area for a robot in the first environment map based on the superimposed image.

15. The non-transitory computer-readable medium according to claim 14, wherein the prohibited area is set in accordance with a designation of the prohibited area on the superimposed image by a user.

16. The non-transitory computer-readable medium according to claim 14, wherein the prohibited area is set based on the projected image.

17. The non-transitory computer-readable medium according to claim 16, wherein the third height range includes a position of an upper end in a height direction of the robot, and is a range from a position higher than a floor of the predetermined region to a position lower than a ceiling of the predetermined region.

18. The non-transitory computer-readable medium according to claim 14, the instructions further causing the processor to:
acquire the third detection data in accordance with a designation of the third height range by a user.

* * * * *